Nov. 3, 1953 R. M. WILLIAMS 2,657,902
TURBINE ROTOR FOR TURBOJET ENGINES
Filed Dec. 17, 1947 2 Sheets-Sheet 1
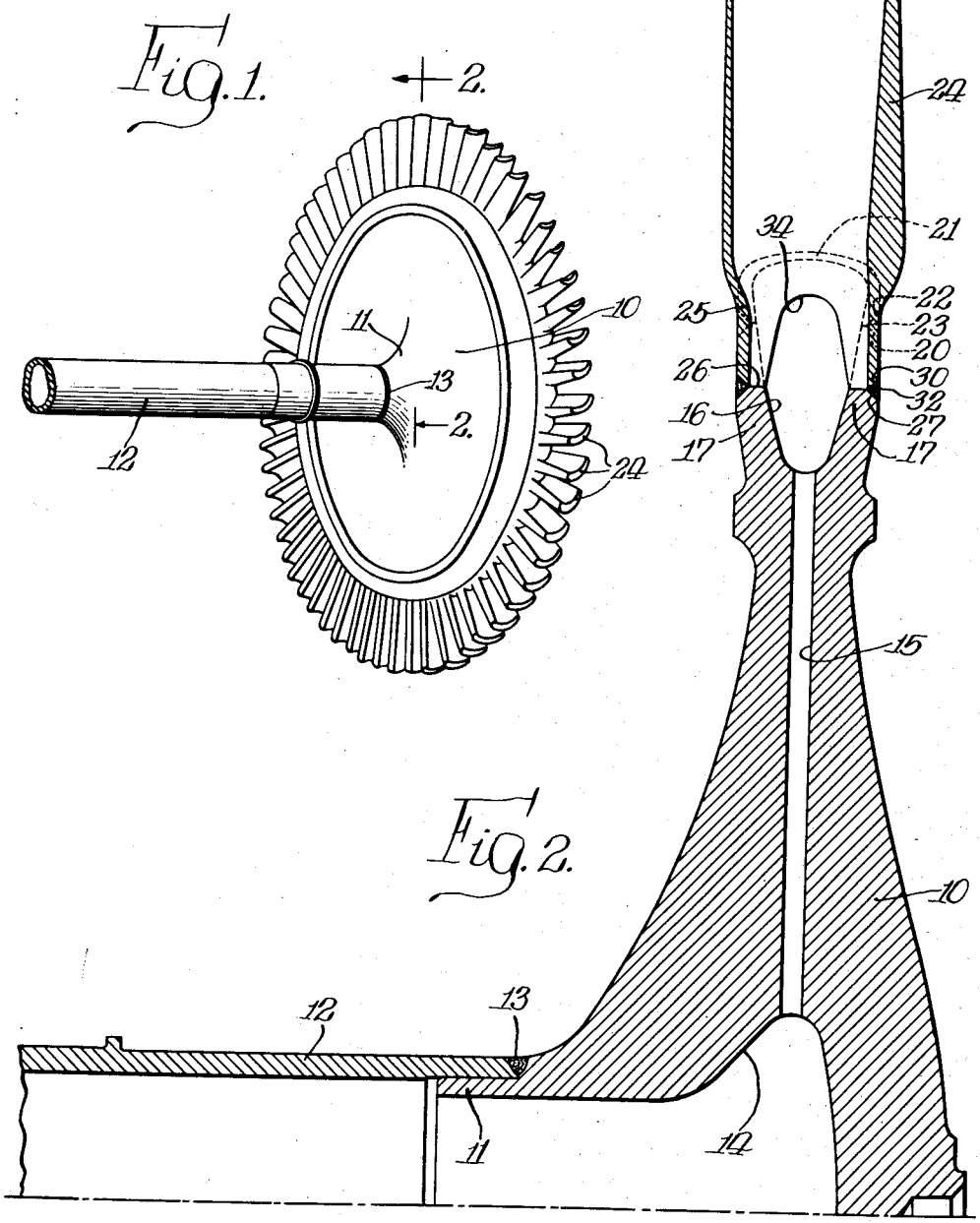

Nov. 3, 1953 — R. M. WILLIAMS — 2,657,902
TURBINE ROTOR FOR TURBOJET ENGINES
Filed Dec. 17, 1947 — 2 Sheets-Sheet 2
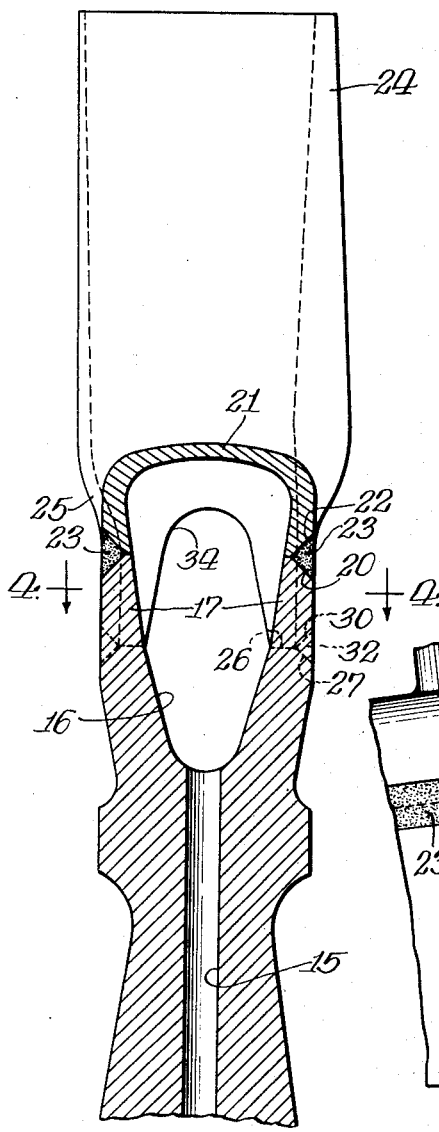
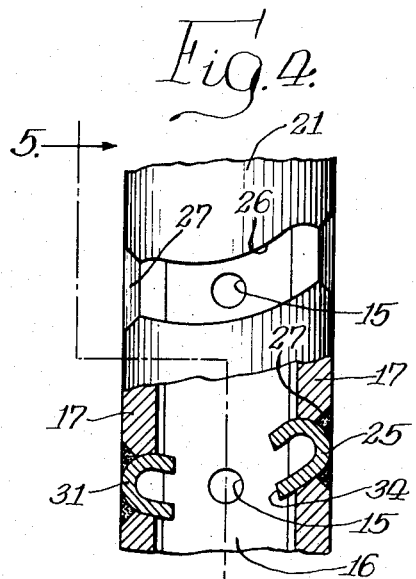
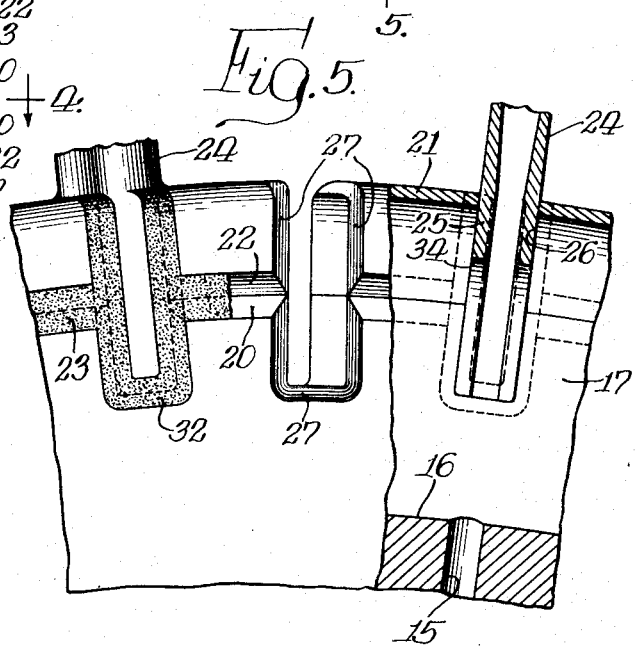
INVENTOR.
Robert M. Williams Patented Nov. 3, 1953

2,657,902

UNITED STATES PATENT OFFICE 2,657,902

TURBINE ROTOR FOR TURBOJET ENGINES

Robert M. Williams, Toledo, Ohio, assignor to Packard Motor Car Company, Detroit, Mich., a corporation of Michigan Application December 17, 1947, Serial No. 792,194

1 Claim. (Cl. 253—39.15)

The invention relates generally to turbine rotor construction and more particularly to a turbine rotor for a turbo-jet engine.

The general object of the invention is to provide a turbine rotor for a turbo-jet engine, having blades secured to the rotor body in a novel manner to provide adequate support for the blades against the forces to which they are subjected.

Another object is to provide a novel turbine rotor having hollow blades mounted on the periphery of the rotor body, with provision made in the structure for securing the blades to the rotor body so that cooling air will be supplied through the rotor body to such structure and to the blades themselves, to prevent overheating thereof by the combustion gases to which the blades are subjected.

Other objects and advantages will become apparent from the following description taken in connection with the accompanying drawings, in which:

Figure 1 is a perspective view of a turbine rotor embodying the features of the invention.

Fig. 2 is a fragmentary transverse sectional view of the rotor shown in Fig. 1, the section being taken in an axial plane extending through one of the blades, as indicated by the line 2—2 of Fig. 1.

Fig. 3 is a view similar to a portion of Fig. 2 but with the section taken in an axial plane extending between the blades.

Fig. 4 is a fragmentary sectional view taken on the line 4—4 of Fig. 3.

Fig. 5 is a fragmentary view, partially in section and taken on the line 5—5 of Fig. 4.

The turbine rotor of the present invention is adapted for a turbine of the gas type. While gas turbines may have many different uses, in the present instance the turbine for which the rotor is provided is adapted for use in a turbo-jet engine. In an engine of this character, the turbine rotor is subjected to a power stream of hot gases flowing from a combustion chamber area in the engine. The turbine absorbs a portion of the energy in the power stream and utilizes such energy to drive a compressor for delivering air to the combustion chamber area. Because of the high temperature of the power stream, to which temperature the blades of the turbine rotor are subjected, and because of the high rotative speed of the rotor, it is, of course, desirable to provide a maximum strength for a minimum weight in the peripheral portions of the rotor. Furthermore, it is desirable to maintain the peripheral portions of the rotor as well as the blades as cool as possible so as to prevent loss of strength in the metal comprising the blades and rotor due to the high temperature.

In a rotor embodying the present invention, a rotor body is provided, which is adapted to receive in a cavity in the central portion thereof a cooling fluid, such as air taken from the ambient atmosphere. Radial passages are provided in the rotor body for carrying the air to the periphery thereof. The turbine blades, of course, are carried on the periphery of the rotor body and, in the present instance, are made hollow so that the air delivered through such radial passages may be conducted outwardly through the blades to maintain the metal thereof at as low a temperature as possible by carrying off the heat absorbed by the blades from the power stream. The turbine rotor rotates at a relatively high speed, so that the stresses at the periphery of the rotor, where the blades are connected thereto, are relatively great. The problem is, therefore, to adequately secure the blades to the periphery of the rotor and, at the same time, provide for flow of cooling air through the blades, the peripheral portion of the rotor also being cooled to maintain the desired strength therein.

With the present invention, a plenum chamber is provided in the peripheral portion of the rotor, which receives air through the radial passages in the rotor body and communicates with the interior of the blades so that maximum cooling of the stressed parts is attained. To form such a plenum chamber, a hollow shroud ring is mounted on the periphery of the rotor body, the interior of the shroud ring cooperating with a groove cut in the periphery of the rotor body to provide the chamber. The blades are mounted in notches cut through the shroud ring and extending into the rotor body itself. The blades are then welded both to the rotor body and to the shroud ring so that they are adequately secured against displacement. To provide for sufficient circulation of air within the plenum chamber, the radial passages are preferably arranged in substantial alignment with the blades, and the blades at their inner ends are provided with circumferentially opening notches so that air may pass into the plenum chamber as well as outwardly through the hollow blades without any great obstruction.

Another feature of the invention resides in the method of securing the shroud to the rotor body. The shroud ring, which preferably has a U-shaped cross section, is first shrunk on the rotor body and is welded thereto at both faces of the rotor body, that is, to the peripheral edge portions of the rotor body formed as a result of the groove cut in the periphery of the body. The shroud ring is thus rigidly secured to the rotor body and may be said to constitute an integral part thereof, and by this method of attachment the plenum chamber may be readily formed. When the blade-receiving notches are cut, the shroud ring is severed into a series of segmental shroud members, since the notches extend inwardly into the rotor body proper. The blades, whose inner end portions substantially close the notches, are then welded both to the rotor body and to the edges of the shroud members at the lines of meeting of the blades therewith.

In the embodiment shown in the drawing, the rotor body is indicated at 10 and may be said to be generally of disc-shaped form. At one side of the rotor body 10, a hub portion 11 is provided which, in the present instance, is shown as telescoping within a tubular shaft 12 and is welded thereto as at 13. The tubular shaft may receive air from the ambient atmosphere or from the compressor and provides a conduit for conducting the air to the interior of the rotor body 10, the body being provided with a central cavity 14 for receiving such air. Extending from the cavity 14 is a plurality of radial air-conducting passages 15 for carrying the air to the periphery of the rotor. To provide a plenum chamber for the air in the peripheral portion of the rotor body, a circumferential groove 16 is cut therein. The groove 16 thus provides a pair of axially spaced edge portions 17 on the periphery of the ring. The outer corners of the edge portions 17 may be beveled as at 20 for welding purposes, as will be hereinafter described.

To complete and enclose the plenum chamber, a shroud ring 21 of generally U-shaped cross section is mounted on the periphery of the rotor body 10. Such shroud ring thereby cooperates with the groove 16 in the rotor body to form the plenum chamber. The arms of the U extend inwardly and, in the present instance, are preferably made at their edges of substantially the same width as the edge portions 17 of the rotor body 10. The outer corners of the edges formed by the arms of the U are beveled as at 22 in a manner similar to the bevel 20 on the rotor body to form a generally triangular groove in the outer face of the rotor. In securing the shroud ring 21 in place, it is preferably first shrunk onto the rotor body so that the edges formed by the arms of the U are in tight contact with the edge portions 17 of the rotor body. The shroud ring is then welded in place and weld metal 23 is filled into the triangular groove formed by the bevels 20 and 22. The shroud ring 21 thus becomes substantially integral with the rotor body 10 but with a plenum chamber therein formed by the groove 16 in the interior of the shroud ring. This hollow construction provides distributed support for the turbine blades without disturbing the smoothness of the gas passages. It also permits using a heat resistant material in the area exposed to the hot gases with the same or a different material for the body of the rotor.

The next step in making the complete rotor is to prepare the rotor body and shroud ring for insertion of the turbine blades. In the present instance, each turbine blade comprises a portion 24 projecting beyond the periphery of the shroud ring and a shank portion 25 inserted within the rotor body and shroud ring for rigidly holding the blade in place, both portions being hollow with a blade opening at each end. To provide for insertion of the blades, a plurality of notches 26 are cut in the periphery of the rotor to receive the shank portions 25. While the notches 26 extend generally transversely to the plane of the rotor body, they may be curved and at a slight angle, as shown in Fig. 4, so that the shank portion 25 may conform generally to the position of the outer portion 24. In the preferred form of blade utilized, the shank portion 25 has a width substantially equal to the thickness of the rotor body at the periphery thereof, as is clearly shown in Figs. 2 and 3. The notches 26 are of sufficient depth to extend inwardly beyond the shroud ring and into the rotor body itself, thereby severing the shroud ring into a plurality of segmental shroud members lying between the respective blades. The surface of the shroud ring and rotor body where the notches intersect such surfaces are beveled, as at 27, for welding purposes except for the peripheral face. The inner ends of the shank portions 25 are beveled as at 30, while the rounding of the side edges of the shank portion, as indicated at 31 in Fig. 4, provide triangular spaces with the beveling of the shroud members and rotor body for the placement of weld metal. The shank portion 25 is then welded both to the shroud members and to the rotor body at the lines of meeting with the outer surfaces thereof, and the triangular grooves formed by the bevels 27 and 30 and the rounding of the edges of the shank portion 25 are filled with weld metal 32 to provide smooth faces where the shank portion 25 meets the side faces of the rotor body and shroud members. Such welding rigidly secures the blades in place and completely closes the plenum chamber in the periphery of the rotor body.

To facilitate the welding process, it will be noted that the edge portions of the shroud ring 21 are of substantially the same cross-sectional area as the edge portions 17 of the rotor body. The thickness of the wall of the hollow blades is also commensurate with the sections to which it is welded so that uniformity of weld is attained at such parts, as well as between the shroud ring and the rotor body.

As to the cooling action, the radial passages 15 of the rotor body are preferably substantially aligned with the inner ends of the blades so that cooling air may be conducted directly thereto. However, the plenum chamber formed by the groove 16 and the shroud members also receives air since the groove 16 extends inwardly beyond the inner ends of the blades, as is apparent in the drawing. To facilitate circulation within the plenum chamber, the shank portions 25 of the blades are provided with notches 34 opening circumferentially within the plenum chamber, so that adequate communication between the radial passages 15, the plenum chamber, and the interior of the blades is thereby provided.

With the structure described, the blades are adequately supported against the stresses to which they are subjected. Moreover, the structure provides for sufficient cooling both of the blades and of the peripheral portions of the rotor so that undue loss of strength of the parts due to high temperatures is not incurred.

I claim:

A turbine rotor for a turbo-jet engine, comprising a generally disc-shaped rotor body having a series of circumferentially spaced notches in its periphery with the notches opening at both faces of the body, a plurality of turbine blades having shank portions located in said notches, each shank portion having a width substantially equal to the thickness of the rotor body at said notches, welded joints cooperating between the shank portion and the rotor body along the lines of meeting of the shank portion with the faces of the rotor body, and shroud members located between the shank portions of the blades and constituting an extension of the rotor body, said shroud members being formed of a heat resistant metal, welded joints between said shroud members and the body at the lines of meeting of the shroud members with the faces of the rotor body and welded joints between said shroud members and the shank portions along the lines where the exterior surface of the side faces of the shroud members meet the shank portions.

ROBERT M. WILLIAMS.

References Cited in the file of this patent

UNITED STATES PATENTS

| Number | Name | Date |
|---|---|---|
| 1,229,490 | London | June 12, 1917 |
| 1,470,506 | Steenstrup | Oct. 9, 1923 |
| 1,657,192 | Belluzzo | Jan. 24, 1928 |
| 2,038,670 | Noack | Apr. 28, 1936 |
| 2,143,466 | Allard | Jan. 10, 1939 |
| 2,264,877 | Haigh | Dec. 2, 1941 |
| 2,354,304 | Celio | July 25, 1944 |
| 2,393,963 | Berger | Feb. 5, 1946 |
| 2,432,185 | Watson | Dec. 9, 1947 |

FOREIGN PATENTS

| Number | Country | Date |
|---|---|---|
| 218,976 | Switzerland | May 1, 1942 |
| 512,301 | Great Britain | Aug. 31, 1939 |
| 573,481 | Germany | Apr. 1, 1933 |